May 12, 1942.  J. L. IPPOLITO, JR  2,282,475
PISTON RING EXPANDER
Filed April 7, 1941  2 Sheets-Sheet 1
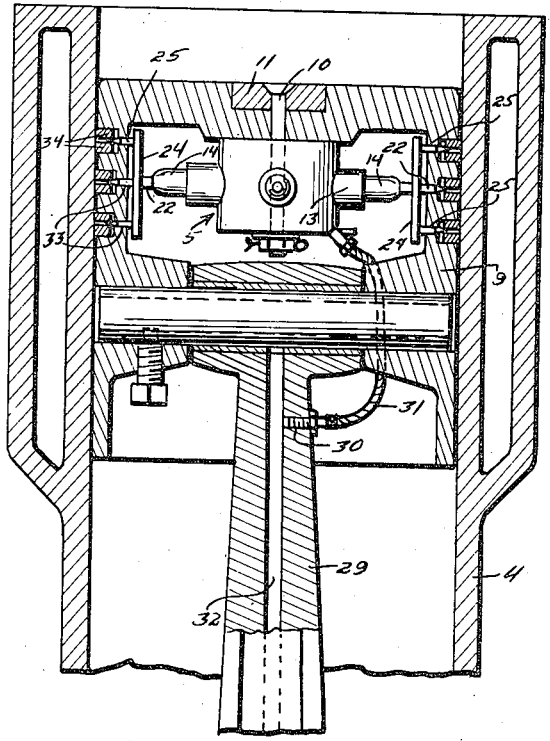
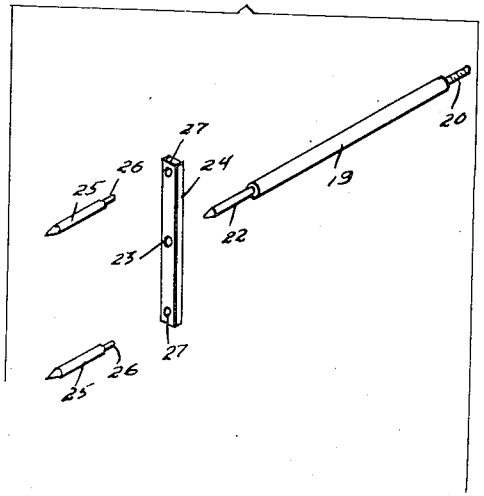
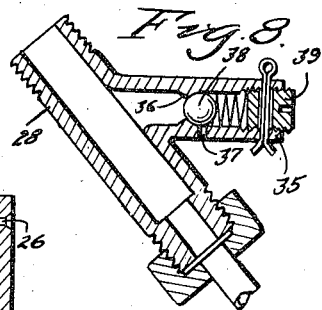
Inventor
JOSEPH L. IPPOLITO, JR.
By *Clarence A. O'Brien*
Attorney May 12, 1942.  J. L. IPPOLITO, JR  2,282,475
PISTON RING EXPANDER
Filed April 7, 1941  2 Sheets-Sheet 2
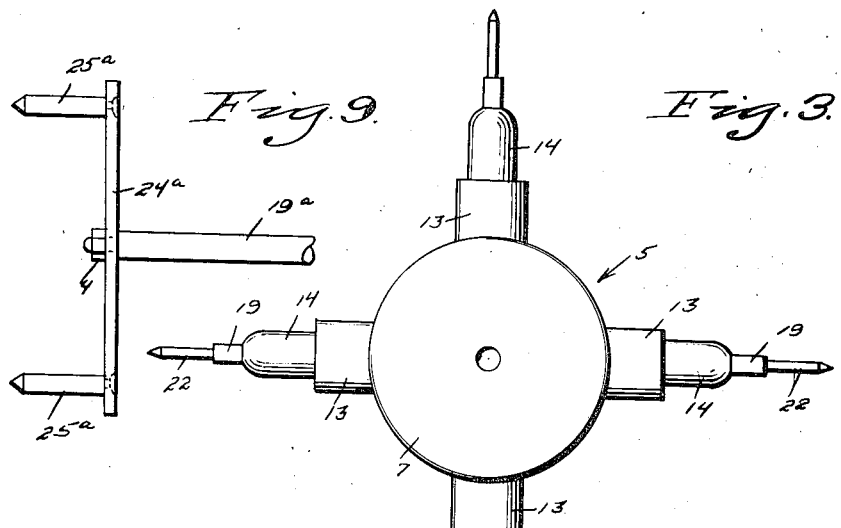
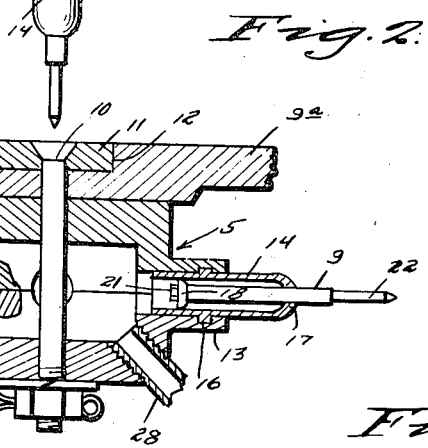
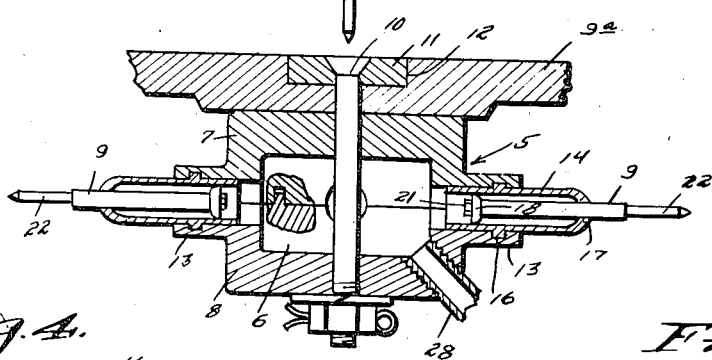
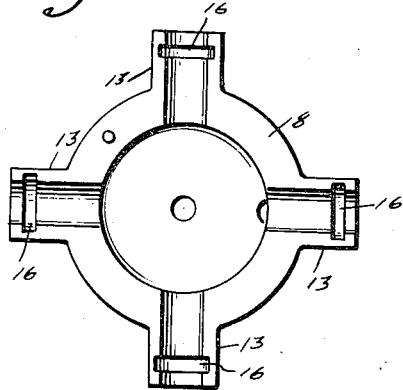
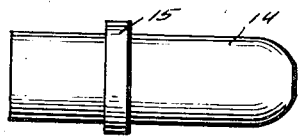
Inventor
JOSEPH L. IPPOLITO, JR.
By Clarence A. O'Brien
Attorney Patented May 12, 1942

2,282,475

UNITED STATES PATENT OFFICE 2,282,475

PISTON RING EXPANDER

Joseph L. Ippolito, Jr., Ansonia, Conn.

Application April 7, 1941, Serial No. 387,308

1 Claim. (Cl. 309—35)

This invention relates to devices for expanding piston rings while seated in the grooves of the piston, and an object of the invention is to provide a device of this character which will eliminate piston slap, oil pumping, and loss of compression.

Further in accordance with the present invention, a device for expanding the piston rings while seated in the grooves of the piston to eliminate the above objections is so designed as to permit utilization of the engine oil pressure in maintaining proper expansion of the piston ring.

Further in accordance with the present invention a piston ring expander is provided which may be readily mounted within the confines of the head of the piston and is equipped with means for positively engaging the rings for expanding the latter radially with respect to the piston for proper engagement with the wall of the power cylinder, and also, where rings, in pairs, are seated in the grooves, to have a wedging action on the rings of the respective pairs for forcing said rings against the top and bottom walls of the piston ring-accommodating groove.

The invention, together with its objects and advantages, will be best understood from a study of the following description taken in connection with the accompanying drawings wherein:

Figure 1 is a vertical sectional view through a power cylinder and piston, and illustrating the application of the invention; the latter being shown in elevation.

Figure 2 is a sectional view through the piston expander and a portion of the piston head.

Figure 3 is a plan view of the expander with certain parts omitted.

Figure 4 is a plan view of one of the casing sections forming part of the invention and hereinafter more fully referred to.

Figure 5 is an elevational view of a cylinder forming part of the invention.

Figure 6 is an exploded view of a pin assembly hereinafter more fully referred to.

Figure 7 is a sectional view through a cross-arm having two of the pins forming part of the assembly shown in Figure 6 associated therewith, with the pins shown in elevation.

Figure 8 is a sectional view through a valve-equipped nipple, hereinafter more fully referred to.

Figure 9 is a fragmentary side elevational view of a slightly modified form of pin assembly.

Referring more in detail to the drawings it will be seen that my piston ring expander is indicated generally by the reference numeral 5.

In the preferred embodiment thereof the expander 5 embodies an oil chamber 6 defined by a casting or casing divided into a pair of complemental half-sections 7 and 8, respectively.

The aforementioned casting or casing embodying the sections 7 and 8 is positioned within the power cylinder 9 as shown in Figure 1, and the sections of the casing are secured together, and the casing itself bodily secured within the power cylinder 9 through the medium of a bolt and nut assembly 10.

The head end of the bolt 10 is engaged by a valve seat 11 that seats conformably within a recess 12 provided therefore in the head 9a of the cylinder as clearly shown in Figures 1 and 2.

For the chamber 6 the casing sections 7 and 8 are complementarily formed to provide a series of radially extending integral tubes or sleeves 13, four of such sleeves being illustrated in the present instance.

Cylinders 14 are seated in the sleeves 13 and provided with circumferential ribs 15 that seat in internal grooves 16 provided in the sleeves 13 to retain the cylinders 14 against axial movement relative to the sleeves.

The sleeves 13 are open at their inner ends and at their outer ends are provided with relatively small orifices 17.

A piston cup 18 has a working fit in each cylinder 14 and each piston cup 18 is associated with a pin assembly such as shown in Figure 6.

The referred to pin assembly, and as shown in Figure 6, embodies a rod 19 that has a working fit through an orifice 17 in a cylinder 14 and is provided at one end with an integral threaded shank 20 on which the piston cup 18 is secured through the medium of a nut 21.

At the opposite end thereof the shank 20 is provided with an integral pin 22 which is extended through an opening 23 provided in a cross-head or bar 24.

Also projecting from the head 24 at opposite ends of the head, and in the direction of, and in parallelism with the pin 22, are pins 25.

As shown pins 22 and 25 are pointed at their free ends, and pins 25 are provided with shanks 26 that are accommodated in apertures 27 provided therefor in the cross-bar or head 24, and then upset as shown in Figure 7 for positively securing the pins 25 to the cross-arm or head 24.

Tapped into the lower section 8 of the chamber-forming casting is a nipple 28, while tapped into the connecting rod 29, as shown in Figure 1, is a nipple 30.

Nipples 28 and 30 are connected together through the medium of a flexible hose or tube 31 so that, as is believed to be apparent, when the motor is in operation oil under pressure from the crankcase and passing upwardly through the oil passage 32 in the connecting rod 29 will pass through the conduit 31 into the chamber 6.

As the pressure of oil in the chamber 6 is built up such pressure will be exerted on the piston cups 18 thus forcing the pin-carrying rods 19 radially outwardly with respect to the chamber 6.

In accordance with the present invention, the skirt of the piston 9, and in the region of the ring grooves, is provided with apertures 33 through which the pointed ends of the pins 22 and 25, respectively, work to engage the rings 34 seated in said grooves as shown in Figure 1.

In the present instance I have shown a pair of rings 34 seated in each ring groove, and as shown the pointed ends of the pins 22 and 25 have a tendency to wedge between the rings of the respective pairs causing the rings of said pairs to spread apart against the top and bottom walls of the respective ring grooves.

It will also be apparent that as the piston cups 18 move toward the orifice ends 17 of the respective cylinders 14 in response to oil pressure thereagainst, the pins 22 and 25 will exert a lateral pressure on the piston rings 34 causing the latter to move radially outwardly with respect to the power cylinder 9 and into proper contact with the wall of the power cylinder 4.

This pressure of the pins on the piston rings will be uniform and the pressure of oil on the piston cups 18 will be more or less automatically controlled through the medium of a ball valve assembly associated with the nipple 28 as shown in Figure 8.

Referring now particularly to Figure 8, it will be seen that the nipple 28 has extending at an angle thereto an integral neck 35 having therein a valve seat 36 and a lateral port 37 below the seat.

Engaging the seat 36 is a ball check valve 38 and the ball check valve 38 is yieldably engaged with its seat 36 through the medium of a spring tension assembly 39. Obviously by adjusting the tension of the spring of the assembly 39, the pressure on the piston cups 28 may be increased or decreased.

It will also be apparent that when the oil pressure in the chamber 6 is greater than the spring tension on the ball valve 38, said valve 38 will be unseated to permit oil to bleed from the chamber 6 thus preventing excessive oil pressure on the piston cups 18.

For use on power cylinders where but two ring grooves are provided a pin assembly such as suggested in Figure 9 may be substituted for the assembly shown in Figure 6.

The assembly shown in Figure 9 is characterized by a cross head 24a provided at the respective opposite ends thereof with pins 25a, and intermediate said ends with an opening to receive the reduced end of the rod 19a, corresponding to the rod 19 in the assembly shown in Figure 6, on which reduced end is threaded a retaining nut 4 for securing the head 24 on the end of the rod 19a.

Thus it will be appreciated that with a piston ring expander embodying the features of the present invention, the expansion of the rings is uniform and maintained constant while the motor is running.

The above and numerous other advantages of the expander, it is believed, readily present themselves to those skilled in the art.

It is thought that further detailed description of the invention is unnecessary in view of the foregoing.

While I have herein illustrated and described the preferred embodiment of the invention, it is to be understood that I claim all such forms of the invention to which I am entitled in view of the prior art and scope of the appended claim.

Having thus described the invention what is claimed as new is:

In combination with a power piston having ring grooves in the skirt thereof and rings in said grooves, a chamber within said piston and having a plurality of cylinders extending radially therefrom, piston elements working in said cylinders, ring-engaging elements having working engagement in openings provided therefor in the skirt of the piston and engaging the rings in said ring grooves for expanding the rings, an operating connection between said ring-engaging elements and said piston elements for transmitting movement from the piston elements to said ring-engaging elements for causing expansion of the piston rings, a connecting rod for said piston and having an oil passage therein, and a conduit connection between the oil passage in said connecting rod and said chamber for conducting oil under pressure to said chamber for action on said piston elements; and said conduit connection embodying a check valve assembly for substantially automatically controlling the pressure of oil within said chamber.

JOSEPH L. IPPOLITO, Jr.